United States Patent
Tani et al.

(10) Patent No.: US 9,981,329 B2
(45) Date of Patent: May 29, 2018

(54) TIP SAW FOR COMPOSITE MATERIAL

(71) Applicant: TANITEC CORPORATION, Tsuzuki-gun, Kyoto (JP)

(72) Inventors: Kohei Tani, Tsuzuki-gun (JP); Tomokazu Ichinose, Tsuzuki-gun (JP)

(73) Assignee: TANITEC CORPORATION, Kyoto (JP)

( * ) Notice: Subject to any disclaimer, the term of this patent is extended or adjusted under 35 U.S.C. 154(b) by 0 days. days.

(21) Appl. No.: 15/356,286

(22) Filed: Nov. 18, 2016

(65) Prior Publication Data

US 2018/0001402 A1    Jan. 4, 2018

(30) Foreign Application Priority Data

Jun. 30, 2016    (JP) .................................. 2016-130950

(51) Int. Cl.
*B23D 61/02* (2006.01)
*B23D 61/04* (2006.01)

(52) U.S. Cl.
CPC ........... *B23D 61/021* (2013.01); *B23D 61/04* (2013.01)

(58) Field of Classification Search
CPC .............................. B23D 61/021; B23D 61/04
USPC .................................. 83/848, 849, 855, 835
See application file for complete search history.

(56) References Cited

U.S. PATENT DOCUMENTS

| | | | | |
|---|---|---|---|---|
| 8,381,625 B2* | 2/2013 | Lizzi | .................... | B23D 61/04 83/835 |
| 2006/0243115 A1* | 11/2006 | Sakai | .................. | B23D 61/025 83/853 |
| 2007/0095190 A1* | 5/2007 | Asada | .................... | B23D 61/04 83/848 |
| 2008/0257127 A1* | 10/2008 | Krishna | ............... | B23D 61/021 83/676 |

FOREIGN PATENT DOCUMENTS

| JP | H7-60649 A | 3/1995 |
|---|---|---|
| JP | 2012-187701 A | 10/2012 |
| JP | 2012-206212 A | 10/2012 |
| JP | 2015-20271 A | 2/2015 |
| JP | 2015-178143 A | 10/2015 |

* cited by examiner

*Primary Examiner* — Omar Flores Sanchez
(74) *Attorney, Agent, or Firm* — Westerman, Hattori, Daniels & Adrian, LLP

(57) ABSTRACT

Provided is a tip saw which is provided with saw blades formed at a predetermined interval on an outer periphery of a disk-shaped base metal and a tip securely attached to a base formed on each saw blade, in which flank faces and rake faces of the tips are set in a staggered manner, and the rake faces are provided at a negative angle of inclination in a direction opposite to a rotation direction of said tip saw, and when a workpiece material is thin-walled, the tips are in substantially fan shapes, and adjacent saw blades have a pitch of less than 3.5 mm or less than 3.0 mm therebetween.

3 Claims, 9 Drawing Sheets

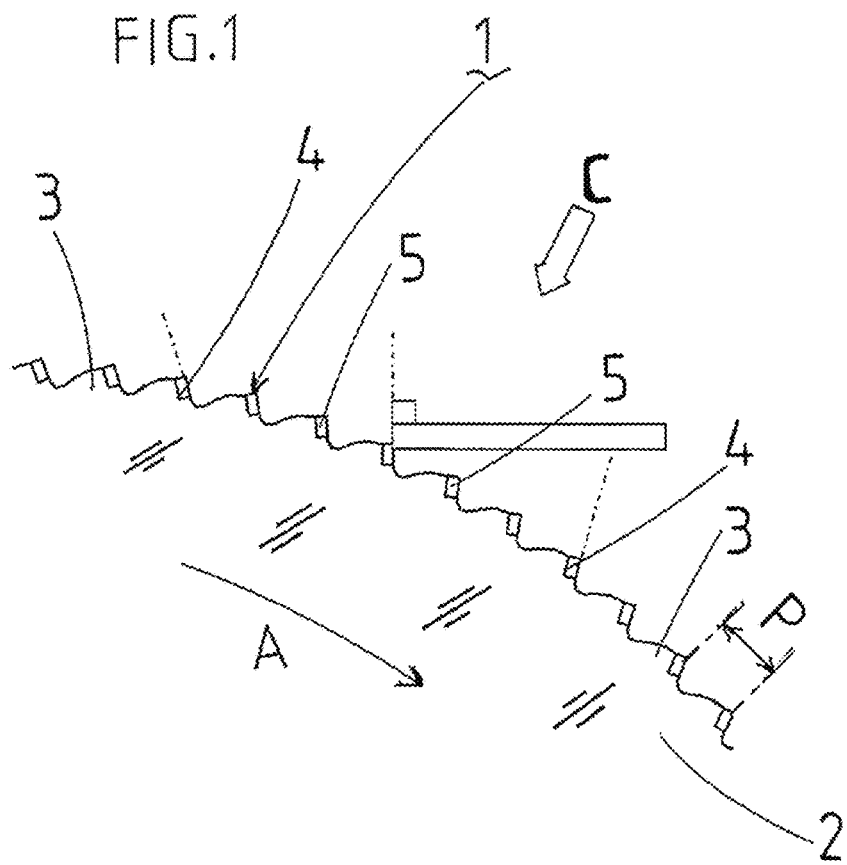
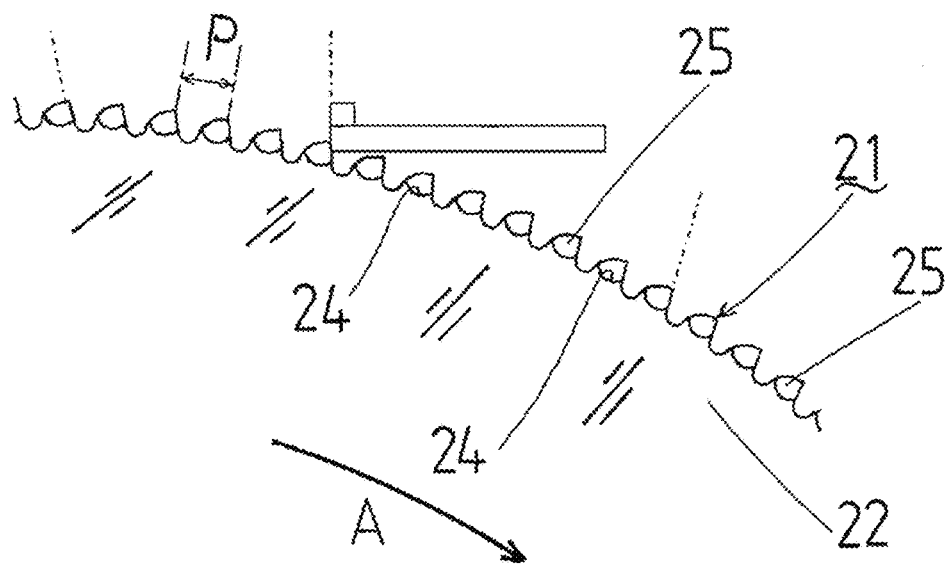

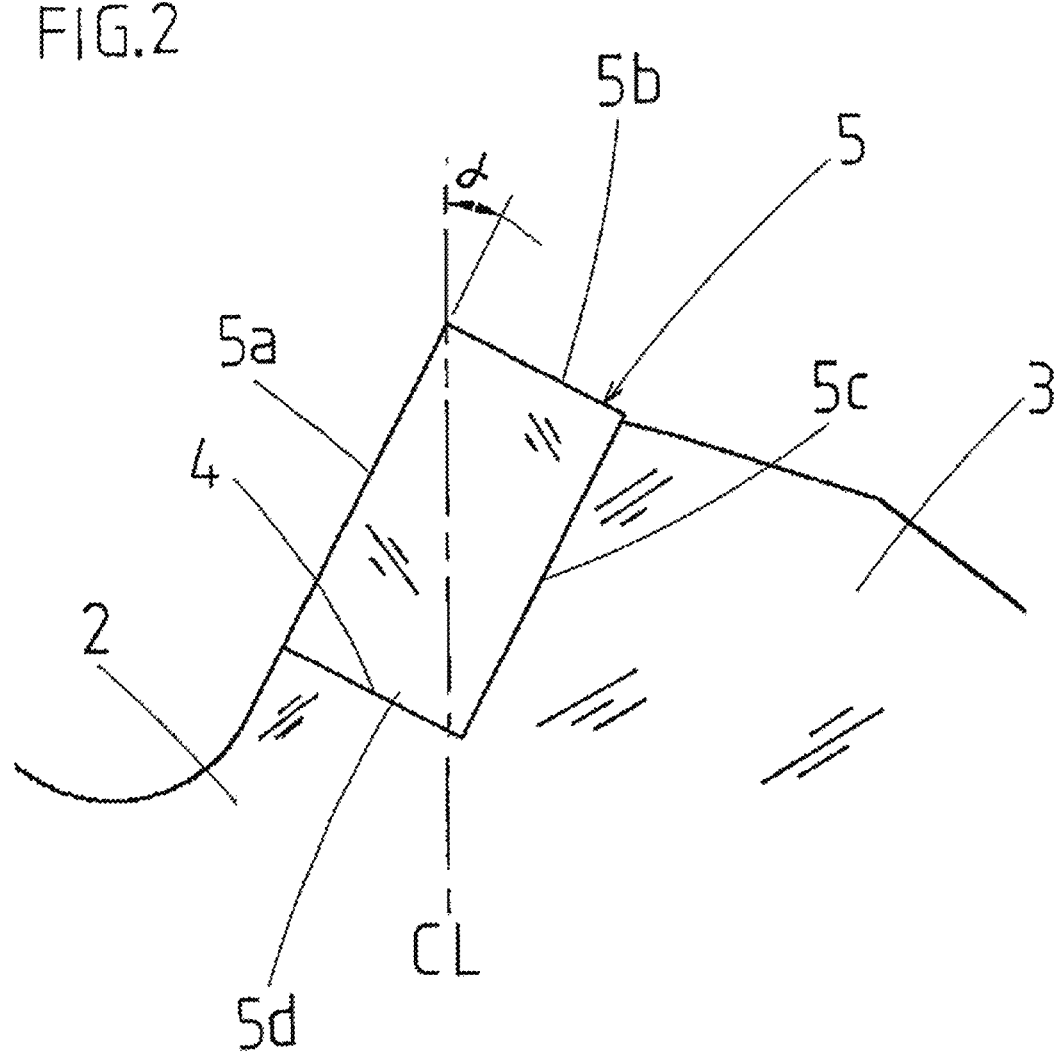

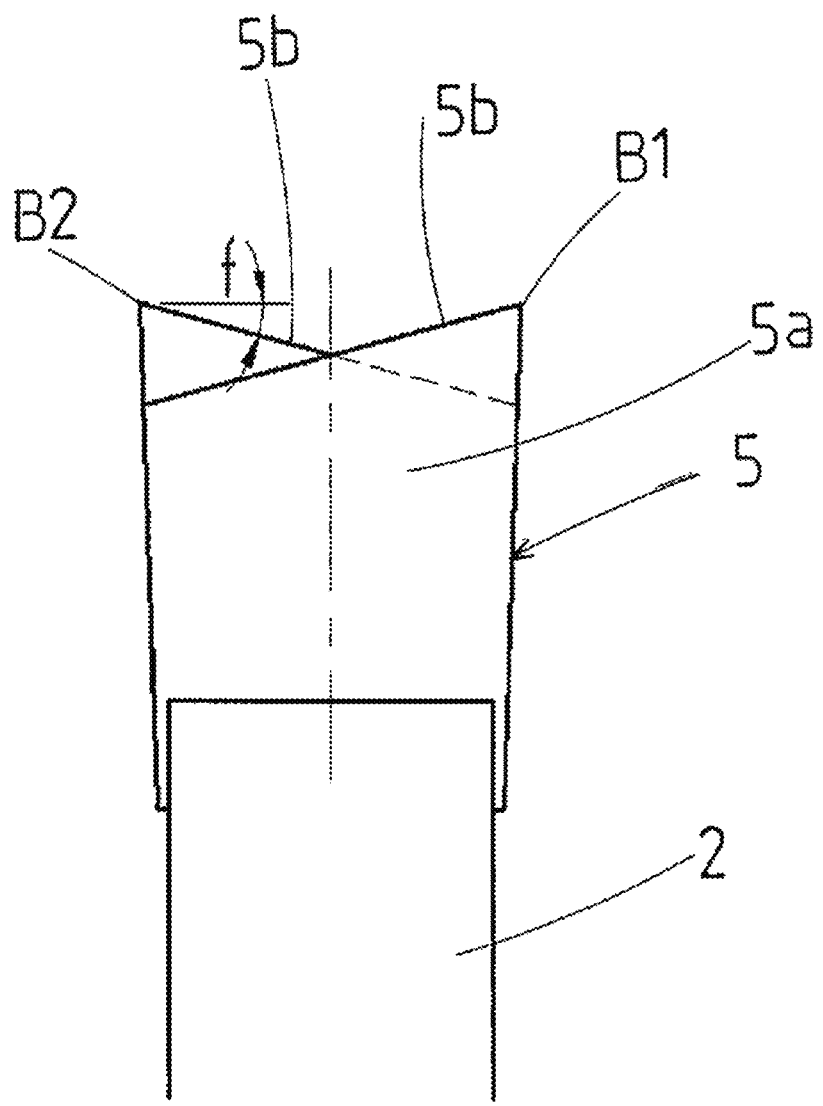

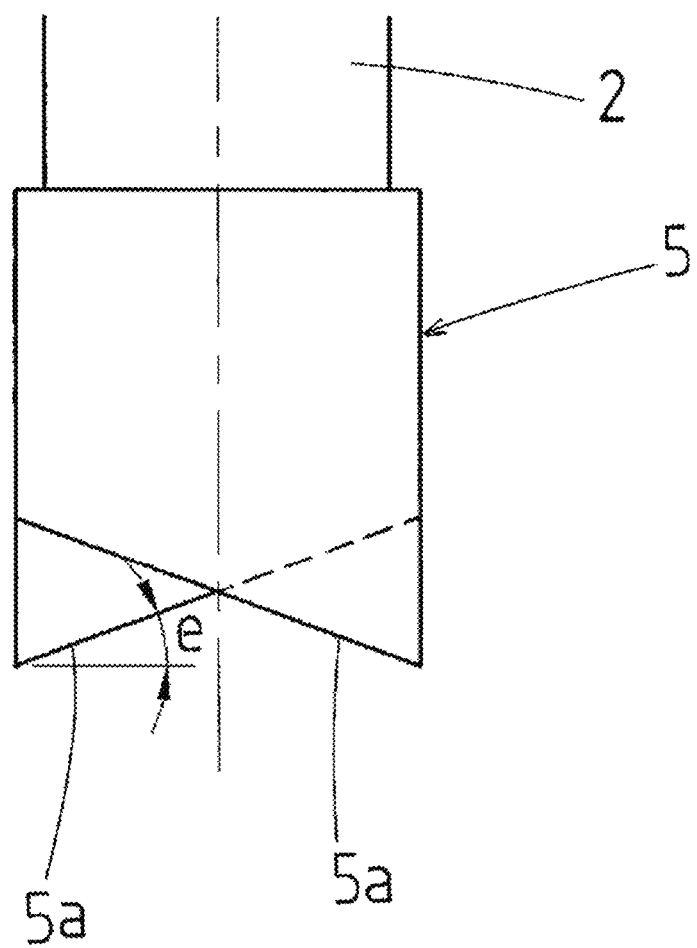

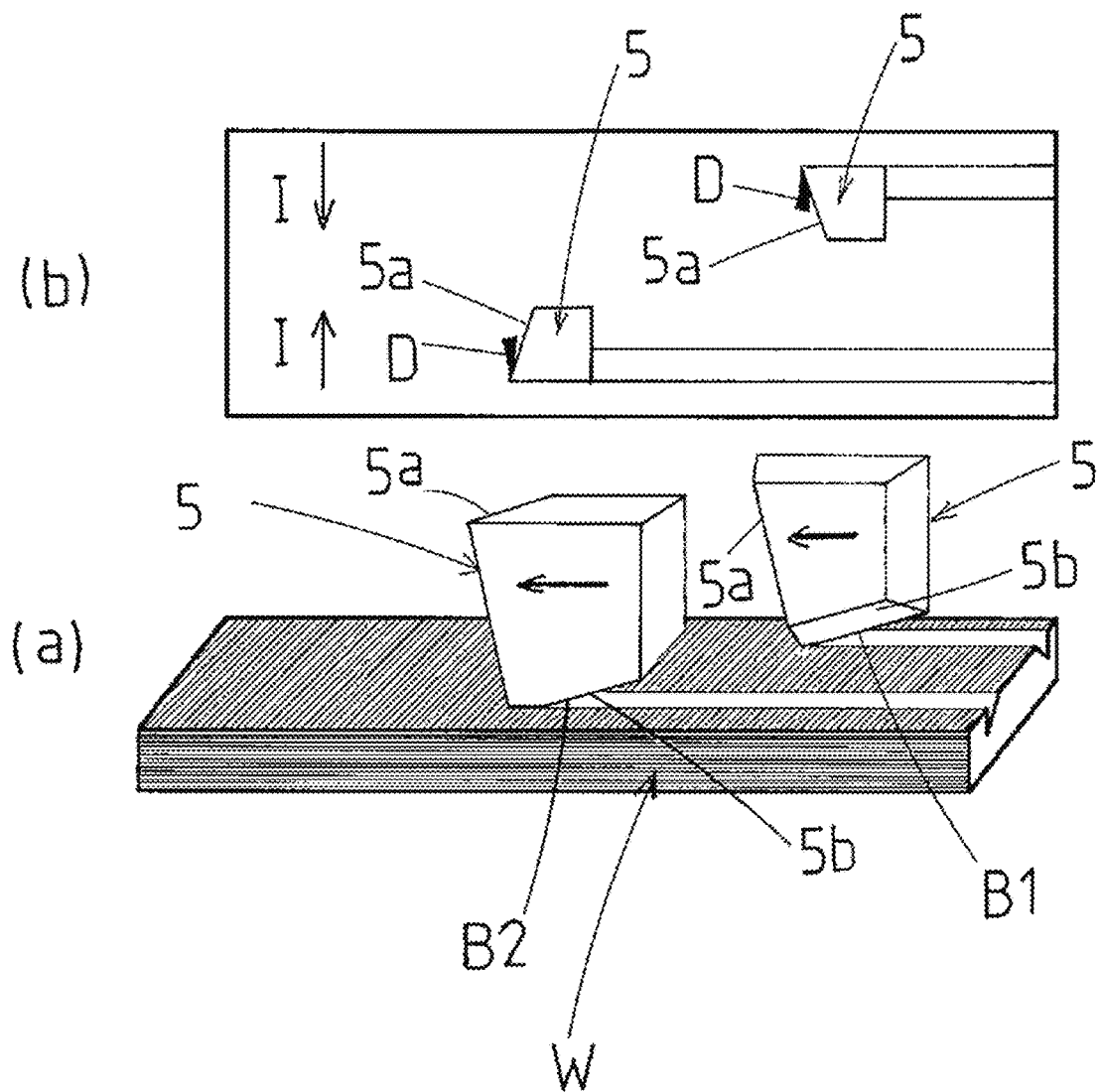

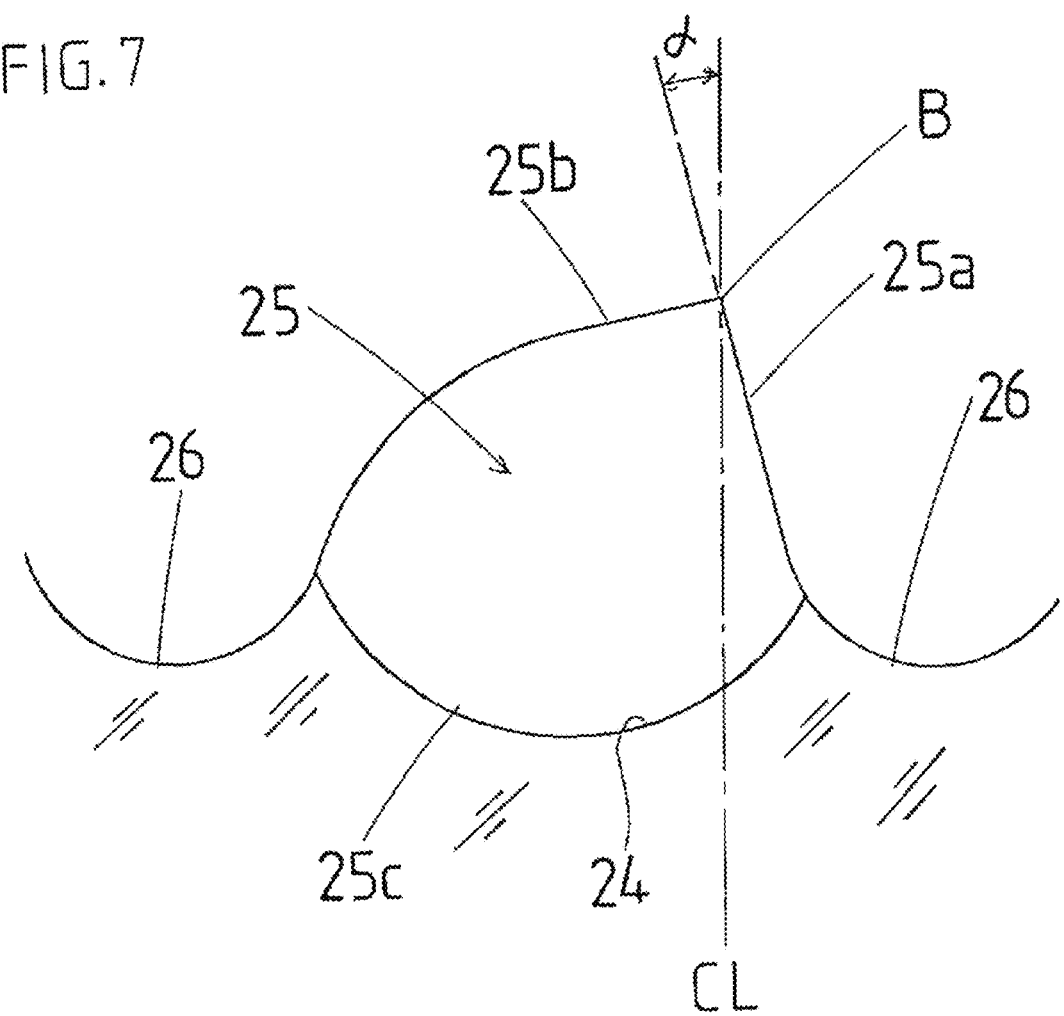

TIP SAW FOR COMPOSITE MATERIAL

DESCRIPTION

Technical Field

The present invention relates to a tip saw for cutting a composite material such as a sandwich panel made up of a honeycomb core material and face sheets spread on both faces thereof and a fiber reinforced plastic, such as a CFRP or a GFRP, including a resin as its matrix and including carbon fibers, glass fibers, or the like as its filler.

Background Art

Sandwich panels are, in greater detail, lightweight and high-strength structural materials made up of a honeycomb core material having a honeycomb structure that is an assembly of hexagonal cells and flat face sheets spread on both faces of the honeycomb core material via a glue or the like, and have been used in a variety of fields such as transportation equipment including automobiles and aircraft and building construction materials in houses and various facilities.

Fiber reinforced plastics are composite materials for which a filler such as glass fiber is mixed in a matrix such as a thermosetting resin and a thermoplastic resin and molded, are relatively low-cost and lightweight and also excellent in physical strength, and therefore have been widely used for boats, bathtubs, various tanks, etc. Particularly, carbon fiber reinforced plastics (CFRPs) have a considerably high strength as well as light weight and thus also have a wider variety of uses in the field of transportation equipment including aircraft, trains, and automobiles.

Moreover, when cutting of such fiber reinforced plastics etc., is performed, ordinarily, a waterjet which is obtained by passing pressurized water through small holes or the like and a cutting wheel for which diamond grains etc., are adhered to the outer periphery of a disk-shaped base metal have been commonly used. However, these means are expensive in cost, and in the case of the cutting wheel, loading occurs during grinding of a fiber reinforced plastic to easily slow the machining speed, and there is a problem of a poor cutting efficiency.

Because the composite material such as a sandwich panel and a fiber reinforced plastic described above is made up of a plurality of different component materials, it is difficult to grind and cut these component materials in a batch manner because of the difference in the hardness, shape, composition, etc., thereof and therefore, so-called burrs, fluffing, surface delamination, etc., are likely to occur at the cut part.

Specifically, in a sandwich panel, the face sheets at both sides are high in hardness and have high strength, whereas the strength of the internal honeycomb core material is low. In a fiber reinforced plastic, the internal fibers (filler) have high strength, whereas the strength of the resin being the base material (matrix) is low. It is not easy to uniformly grind and cut such composite materials. Therefore, in the sandwich panel, burrs and deformation are likely to occur at the time of its grinding and cutting, and collapse and the like of the honeycomb core material is also likely to occur. In the fiber reinforced plastic, melting of the base material, fluffing of the fibers, surface delamination, etc., are likely to occur.

SUMMARY OF INVENTION

The present invention aims to solve the variety of problems described above collectively, for a tip saw for a composite material for a fiber reinforced plastic such as a CFRP or a composite material such as a sandwich panel with a honeycomb structural material sandwiched, so as to enable easily performing excellent grinding and cutting.

It is an object of the present invention to always cut the outer filler while grinding the inner matrix to thereby prevent surface delamination from occurring at a cut part of a fiber reinforced plastic being a workpiece material.

It is another object of the present invention to have a cutting edge angle in a range of approximately 75° to approximately 105° with respect to a composite material being a workpiece material to thereby obtain a part that is cut in at always 90° (right angle).

It is an object of the present invention to prevent delamination and fluffing of the filler (fibers) by the cutting-in with a cutting edge angle of 90° (right angle).

Further, it is an object of the present invention to sharply cut the filler in a fiber reinforced plastic without releasing in combination with an effect of successive grinding by staggered teeth to be described below.

Another object of the present invention is to make chips of a composite material move toward the center in a tip thickness direction at the time of its grinding and cutting to thereby prevent the chips from colliding against the composite material during grinding to damage the part concerned.

The present invention provides a tip saw for a composite material, the tip saw being provided with bases that are formed at a predetermined interval on an outer periphery of a disk-shaped base metal and a single tip that is securely attached to each base, in which flank faces of the tips are provided as staggered teeth pointed alternately at left and right ends, said staggered teeth being composed of inclined surfaces descending from a left end to a right end and from a right end to a left end, respectively, as viewed in a rotation direction of said tip saw, and rake faces are provided as staggered teeth pointed alternately at left and right ends, said staggered teeth being composed of inclined surfaces descending from a left end to a right end and from a right end to a left end, respectively, as viewed in a radial direction of said tip saw, and the rake face of each tip is provided at a negative angle of inclination in a direction opposite to the rotation direction of said tip saw with reference to a center line extending from a center of the base metal toward the outer periphery.

In the present application, the "composite material(s)" connote all composites for which two types or more of mutually different materials are combined such as sandwich panels and fiber reinforced plastics.

BRIEF DESCRIPTION OF DRAWINGS

FIG. 1 is a side view showing a part of a tip saw according to Embodiment 1 of the present invention.

FIG. 2 is an enlarged view of a saw blade part of the tip saw in FIG. 1.

FIG. 3 is a front view showing staggered teeth of a flank face part in the same tip saw.

FIG. 4 is a front view showing staggered teeth of a rake face part in the same tip saw.

FIG. 5 includes enlarged perspective views of a tip part showing a grinding state by the same tip saw.

FIG. 6 is a side view showing a part of a tip saw of Embodiment 2.

FIG. 7 is an enlarged view of a tip part of the tip saw in FIG. 6.

DESCRIPTION OF EMBODIMENTS

Figure 8:
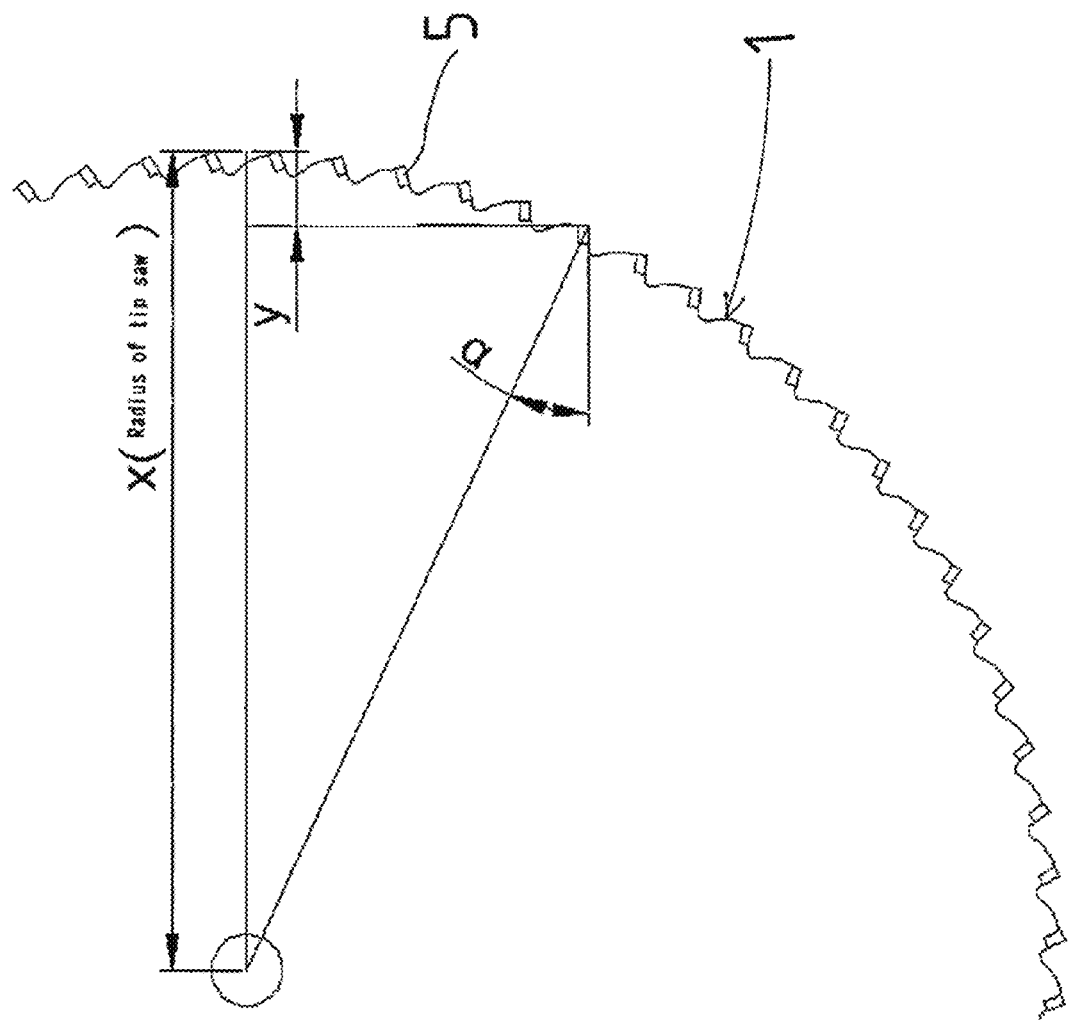
FIG. 8 is a side view showing an abutting state of tips in the tip saw of Embodiment 1 against a workpiece material.

Hereinafter, embodiments of the present invention will be described in accordance with the drawings, but the present invention is not limited to such embodiments.

As shown in FIG. 1 to FIG. 4, a tip saw 1 for a composite material according to the present embodiment is produced by forming saw blades 3 at fixed intervals on the outer periphery of a disk-shaped base metal 2 and securely attaching tips 5 to bases 4 formed on the respective saw blades 3.

The tips 5, in the present embodiment, show substantially longitudinal rectangular shapes, and have, in the saw blades 3 that are inclined from one side to the other side of the base metal 2 and adjacent to each other, cutting edges B1 and B2 located at opposite sides to each other. Moreover, a front portion of the tip 5 is provided as a rake face 5a, a top portion 5b of the tip 5 is provided as a flank face, and a rear portion 5c and a bottom portion 5d of the tip 5 are joined to the base 4.

In the present embodiment, the adjacent saw blades 3 have a pitch P of approximately 4.0 mm or more therebetween.

As shown in FIG. 3, the flank faces 5b of the adjacent tips 5 are provided as staggered teeth pointed alternately at their left and right ends which are composed of inclined surfaces descending from its left end to right end and from its right end to left end, respectively, as viewed in a rotation direction A of said tip saw 1.

As shown in FIG. 2 and FIG. 4, the rake faces 5a of the adjacent tips 5 are provided as staggered teeth pointed alternately at their left and right ends which are composed of inclined surfaces descending from its left end to right end and from its right end to left end, respectively, as viewed in a radial direction C of said tip saw 1, and are provided at a negative angle $\alpha$ of inclination in a direction opposite to the rotation direction A of said tip saw 1 with reference to a center line CL extending from a center of the base metal 2 toward the outer periphery.

The base 4 is formed in a substantially L-shape in a lateral view on the saw blade 3 bulging outward from an outer edge of the base metal 2. Moreover, as shown in FIG. 5(a), at the time of grinding of a fiber reinforced plastic W being a workpiece material, because the flank faces 5b of the tips 5 are provided as staggered teeth, cutting-in by the left and right cutting edges B1 and B2 is performed alternately in a well-balanced manner, and the pointed cutting edges B1 and B2 operate in cooperation to cut the filler (fibers) of the fiber reinforced plastic W while further cutting in the same to grind the matrix (resin). As a result, no fluffing or surface delamination occurs in the fiber reinforced plastic W being a workpiece material.

Further, as shown in FIG. 5(b), because the rake faces 5a of the tips 5 are provided as staggered teeth pointed alternately at their left and right ends which are composed of inclined surfaces descending from its left end to right end and from its right end to left end, respectively, as viewed in a radial direction C of said tip saw 1, chips D move to the inside I (toward the center in a tip thickness direction).

Next, another embodiment of the present invention will be described.

As shown in FIG. 6 and FIG. 7, a tip saw 21 is produced by forming bases 24 at fixed intervals on the outer periphery of a disk-shaped base metal 22 and securely attaching tips 25 to the bases 24. Each tip 25 is formed in a substantially fan shape, and has, with respect to a cutting edge B as a vertex, a radial portion 25a at a front side provided as a rake face and a radial portion 25b at a rear side provided as a flank face, and has a convex arcuate portion 25c connecting both radial portions 25a and 25b provided as a secure attaching portion. Moreover, the convex arcuate portion 25c of the tip 25 is securely attached by brazing or the like to the base 24 in a concave arc shape on the outer periphery of the base metal 22. In the present embodiment, the adjacent tips 25 have a pitch P of less than approximately 4.5 mm therebetween. Similar to the embodiment described above, the rake faces 25a of the tips 25 are provided at a negative angle $\alpha$ of inclination in a direction opposite to a rotation direction A of said tip saw 21 with reference to a center line CL extending from a center of the base metal 22 toward the outer periphery.

Each of the concave arc-shaped bases 24 in the tip saw 21 of the present embodiment is in a form recessed from the outer periphery of the disk-shaped base 22 toward the center. Moreover, by the substantially fan-shaped tips 25 described above being securely attached to the bases 24, a gullet 26 is formed between the adjacent tips 25.

Further, the pitch P of the adjacent tips in said tip saw 21 is, more preferably, on the order of 3.5 mm to 3.0 mm. Therefore, the pitch can be made considerably narrower than that of the adjacent tips 5 in the tip saw 1 of the embodiment described above.

Also in the present embodiment, similar to the above-mentioned embodiment and its FIG. 3 and FIG. 4, the rake faces 25a and the flank faces 25b of the tips 25 on the outer periphery of the base metal 22 are both provided as staggered teeth pointed alternately at their left and right ends which are composed of inclined surfaces descending from its left end to right end and from its right end to left end, respectively.

Besides the above, because said tip saw 21 is configured, as described above, with the tips 25 being in substantially fan shapes, the radial portions 25a at a front side provided as rake faces, the radial portions 25b at a rear side provided as flank faces, and the convex arcuate portions 25c connecting both radial portions 25a and 25b securely attached to the concave arc-shaped bases 24 formed at fixed intervals on the outer periphery of the base metal 22, when heating a center part of the tip 25 for joining said tip 25 to the concave arc-shaped base 24, the heat is dissipated uniformly and efficiently to the base 24 of the base metal 22 via the convex arcuate portion 25c of said tip 25, and thus the thermal effect on the outer periphery of the base metal 22 is suppressed to the minimum.

Moreover, as shown in FIG. 7, with the above, because the fan-shaped tip 25 is directly joined to the concave arc-shaped base 24 of the base metal 22 and the flank face 25b of the tip 25 is connected in series with an end portion of the base 24 in shape, the above-mentioned heat dissipation effect can be more promoted.

Therefore, as described above, narrowing the pitch of the adjacent tips to the order of 3.5 mm is realized in said tip saw 21.

More specifically, by realizing the minimum pitch described above, the tip saw 21 can perform grinding in a stable manner, even when the thickness of a composite material such as a CFRP (Carbon Fiber Reinforced Plastic) is a very thin sheet thickness of less than 3 mm or not more than 1 mm, without vibrating the composite material. Moreover, in this case, even when the matrix of the composite material is a thermoplastic, the tip saw 21 can, because of having tips with the minimum pitch as described above, prevent the thermoplastic from welding by efficient heat dissipation to reliably perform a grinding operation.

Figure 9:
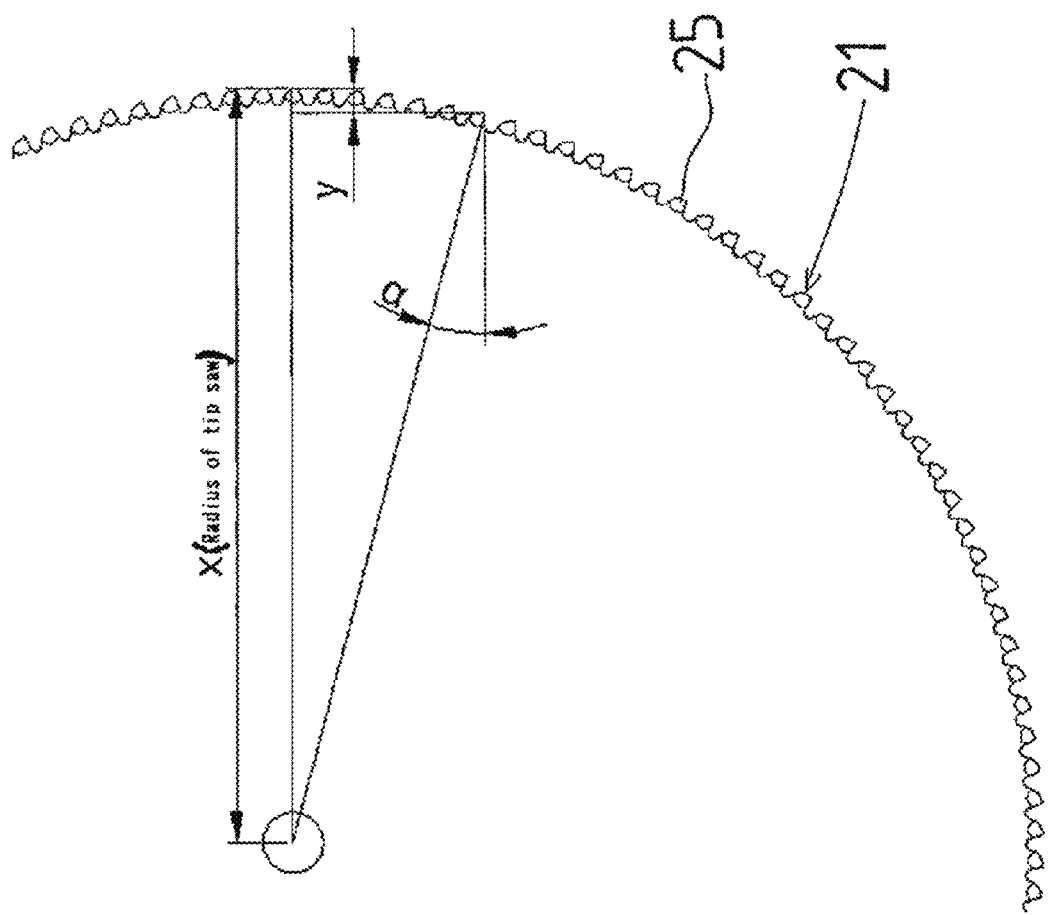
FIG. 9 is a side view showing an abutting state of tips in the tip saw of Embodiment 2 against a workpiece material.

Moreover, as shown in FIG. 8 and FIG. 9, when grinding composite materials such as CFRPs by the tip saw 1, 21 configured as described above, because the grinding is performed with the cutting edge being in a range of 75° to 105° with respect to these workpiece materials, and there is a part where the rake face 5a, 25a of the tip 5, 25 cuts in at a right angle, delamination of the fibers in the fiber reinforced plastic being a workpiece material is prevented in this part, and said fiber reinforced plastic is completely and smoothly cut.

In greater detail, where the rake angle is provided as $-\alpha$ and the radius of said tip saw is provided as x, the cutting edge angle and the angle $\beta$ of the FRP sheet can become 90° at a position with an angle of $\alpha$. The length of y determined there is $y=x(1-\cos \alpha)$, and if the saw has a diameter of 200 mm and a cutting edge angle $-\alpha$ of 30°, $y=200/2 (1-\cos 30°)$, and which is=100 (1-0.866)=13.40 mm based on cos 30°=0.866. The angle between the cutting edge and sheet accordingly becomes 90° when the distance from the cutting edge to the center of a sheet thickness is 13.40 mm, and the cutting edge of the tip perpendicularly abuts against the workpiece material to enable cutting. As a result, sharp grinding can be realized.

Moreover, for example, by applying a dehydrogenative DLC (Diamond-Like Carbon) coating of a fixed width to an outer peripheral part of the tip saw 1, 21, a further improvement in grinding performance and effective prevention of wear and deterioration associated with use can be achieved.

Figure 10:
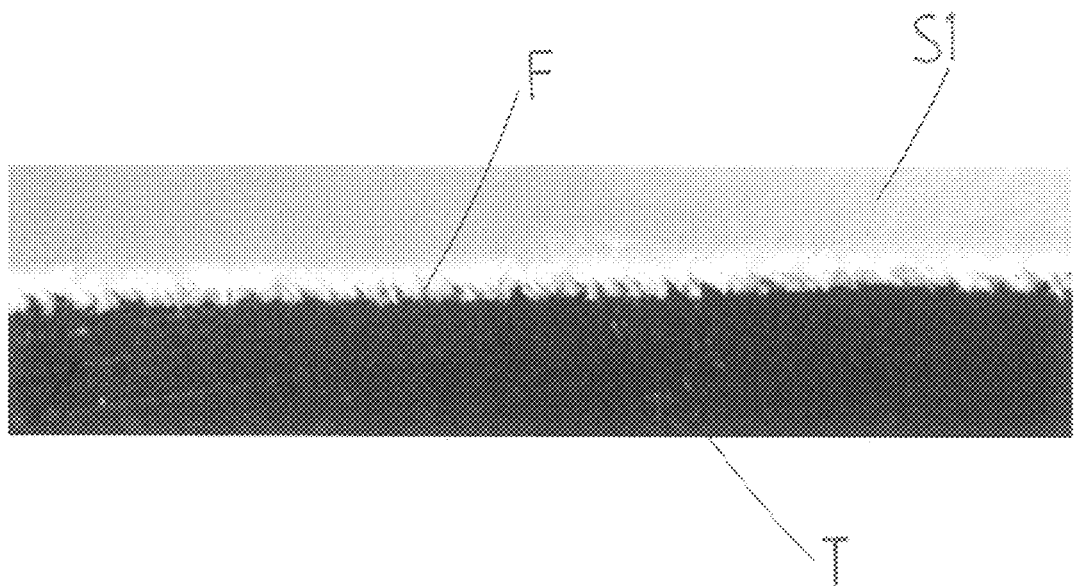
FIG. 10 is a cut section image of a workpiece material showing a result of a grinding test by a conventional tip saw.

Next, description will be given of cutting tests. As a result of grinding and cutting tests of aramid fiber reinforced plastics W performed by the tip saw 1, 21 of the embodiment described above and a conventional tip saw the rake faces of the tips of which are provided at a positive angle and not provided as staggered teeth as in the present invention, as shown in FIG. 10, fluffing F was confirmed in a grinding surface S1 on an examination table T with the conventional tip saw.

Figure 11:
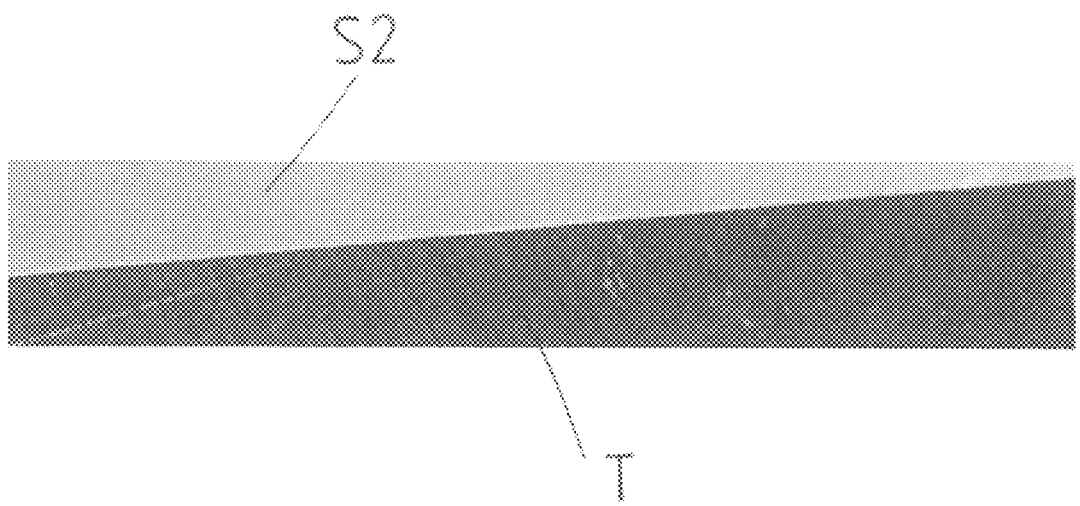
FIG. 11 is a cut section image of a workpiece material showing a result of a grinding test by the tip saw according to the embodiment.

On the other hand, as shown in FIG. 11, with the tip saw 1, 21 according to the embodiment, the above-mentioned burrs, fluffing, and surface delamination were not observed at all in a grinding surface S2 on the examination table T. Further, with the tip saw 1, 21 of the embodiment applied with the above-mentioned dehydrogenative DLC (Diamond-Like Carbon) coating, a reduction in frictional resistance during grinding was notably observed.

More specifically, because of the dehydrogenative DLC coating of a fixed width applied to the outer peripheral part of the base metal 22, surface smoothness and a reduction in friction coefficient during grinding can be achieved. Therefore, grinding heat itself to be generated at the cutting edge at the time of cutting of a workpiece material can be suppressed, and with which the tool life can be extended and prevention of plastic deformation of the base metal, and a further improvement in grinding performance for a thermoplastic with a low melting temperature are enabled. Moreover, by the above-mentioned DLC coating, the friction coefficient is reduced to approximately ¼ of that by a commonly applied PVD coating.

The invention claimed is:

1. A tip saw for a composite material, the tip saw being provided with bases that are formed at a predetermined interval on an outer periphery of a base metal having a disk shape and a single tip securely attached to each base, wherein the tips have their flank faces provided as staggered teeth pointed alternately at left and right ends, said staggered teeth being composed of inclined surfaces descending from a left end to a right end and from a right end to a left end, respectively, as viewed in a rotation direction of said tip saw, and have their rake faces provided as staggered teeth pointed alternately at left and right ends, said staggered teeth being composed of inclined surfaces descending from a left end to a right end and from a right end to a left end, respectively, as viewed in a radial direction of said tip saw, and the rake face of each tip is provided at a negative angle of inclination in a direction opposite to the rotation direction of said tip saw with reference to a center line extending from a center of the base metal toward the outer periphery, wherein an outer peripheral part of the tip saw is applied with a dehydrogenative DLC coating of a fixed width.

2. The tip saw for a composite material according to claim 1, wherein the base shows a concave arc shape in a side view, the tip shows a substantially fan shape in a side view and has a radial portion at a front side provided as a rake face and a radial portion at a rear side provided as a flank face, and a convex arcuate portion connecting both radial portions is securely attached to the base.

3. The tip saw for a composite material according to claim 1, wherein the base shows a substantially L-shape in a side view and is provided on saw blades integrally formed at a predetermined interval by extension from the outer periphery of the base metal, the tip shows a substantially rectangular shape in a side view and has a front portion provided as a rake face and a top portion provided as a flank face, and rear and bottom portions of the tip are securely attached to the base.

* * * * *